United States Patent [19]

Endo et al.

[11] Patent Number: 4,704,997
[45] Date of Patent: Nov. 10, 1987

[54] DEVICE FOR PREVENTING ABNORMAL FLOW OF GAS FUEL FROM GAS FUEL INJECTOR OF DIESEL ENGINE

[75] Inventors: Yasuhisa Endo; Shuhei Mizuhara; Satoshi Murakami; Osamu Beppu; Saiji Toshioka, all of Okayama, Japan

[73] Assignee: Mitsui Engineering and Shipbuilding Co. Ltd., Tokyo, Japan

[21] Appl. No.: 878,079

[22] Filed: Jun. 24, 1986

[30] Foreign Application Priority Data

Jun. 24, 1985 [JP] Japan ............... 60-95525[U]
Aug. 13, 1985 [JP] Japan ............... 60-178136
Aug. 16, 1985 [JP] Japan ............... 60-125550
Aug. 19, 1985 [JP] Japan ............... 60-181373
Dec. 27, 1985 [JP] Japan ............... 60-295772

[51] Int. Cl.$^4$ ............................. F02B 77/00
[52] U.S. Cl. .................. 123/198 DB; 123/27 GE; 123/575
[58] Field of Search ........... 123/527, 575, 198 DB, 123/27 GE

[56] References Cited

U.S. PATENT DOCUMENTS 3,738,346  6/1973  Goodman ............... 123/198 DB
4,619,230 10/1986  Collonia ............... 123/198 DB
4,619,240 10/1986  Bedford et al. ......... 123/27 GE

FOREIGN PATENT DOCUMENTS

2756393 6/1979 Fed. Rep. of Germany ...... 123/198 DB
1068607 5/1967 United Kingdom ........ 123/198 DB Primary Examiner—E. Rollins Cross
Attorney, Agent, or Firm—Robbins & Laramie

[57] ABSTRACT

A device for preventing abnormal flow of gas fuel from a gas fuel injector of a diesel engine. The device has a pipe for supplying a pressurized gas fuel, a fuel injector including a passage connected to the pipe and leading to fuel injection nozzle ports, and a fuel cut-off valve means adapted to close the gas fuel passage upon detection of a reduction of the fuel pressure in the fuel passage. Any abnormal supply of fuel due to stick of the fuel injector is prevented so as to avoid any risk of explosion which otherwise may be caused by the abnormal supply of the gas fuel.

8 Claims, 12 Drawing Figures

DEVICE FOR PREVENTING ABNORMAL FLOW OF GAS FUEL FROM GAS FUEL INJECTOR OF DIESEL ENGINE

BACKGROUND OF THE INVENTION

1. Field of the Invention

The present invention broadly relates to a medium- or low-speed diesel engine which operates with a gas fuel and, more particularly, to a device for preventing abnormal flow of fuel from a gas fuel injector of such a diesel engine.

2. Description of the Related Art

In operation of a gas fuel diesel engine, a gas injector operates to inject a gas fuel into cylinders in synchronism with the combustion cycles in these cylinders. The rate of injection of the gas fuel is controlled by a gas fuel controller. The gas injector has a valve which is connected to and operated by a spindle so as to open and close the passage through which the gas fuel is injected. This known gas injector, however, involves a risk of stick of the spindle due to, for example, jamming of foreign matters, with a result that the valve is kept opened regardless of the combustion cycle so that a large quantity of gas fuel reaches the exhaust pipe of the engine through the cylinder. In consequence, the concentration of the gas fuel in the exhaust pipe is increased to cause an explosion in the exhaust pipe. Such an explosion may seriously damage the diesel engine.

In order to obviate this problem, it has been proposed to limit the maximum flow rate of the gas fuel by an orifice provided in the main pipe of the gas fuel. The cross-sectional area of the orifice port is selected to be slightly greater than that corresponding to the fuel injection rate corresponding to the maximum load per cylinder. This proposal, however, is still unsatisfactory in that, in the event of a stick of the gas injector while the engine is operating at a comparatively low load level, the gas fuel is injected at the rate corresponding to the maximum load level, whereas the flow rate of the intake air is controlled in accordance with the load level, so that the concentration of the fuel in the exhaust pipe is increased beyond the explosion limit, causing a risk of an explosion in the exhaust pipe.

SUMMARY OF THE INVENTION

Accordingly, an object of the invention is to provide a device for preventing abnormal flow of gas fuel from a gas injector of a diesel engine, capable of eliminating any risk of explosion attributable to a stick of the gas injector over the entire range of load, thereby overcoming the above-described problems of the prior art.

Another object of the invention is to provide a device for preventing abnormal flow of fuel from a gas fuel injector, which is capable of closing the fuel injection passage when the fuel pressure in a fuel passage has come down below a normal pressure due to an abnormal flow of the gas fuel from the gas injector.

Still another object of the invention is to provide a device for preventing abnormal flow of fuel from a gas fuel injector, capable of shutting off a fuel supply passage when the flow rate of the gas fuel from a gas fuel injector is increased beyond a predetermined level.

A further object of the invention is to provide a device for preventing abnormal flow of fuel from a gas fuel injector, capable of shutting off a fuel supply passage when the flow rate of the gas fuel from a gas fuel injector is increased beyond a predetermined level which is controllable in accordance with the level of the load on the engine.

To these ends, according to the invention, there is provided a device for preventing abnormal flow of gas fuel from a gas fuel injector of a diesel engine comprising: a pipe means for supplying a pressurized gas fuel; a fuel injector means including a housing having a passage connected to the pipe means and leading to fuel injection nozzle ports, and a valve member having a piston portion adapted to open and close the passage by the force produced by a control oil in accordance with the speed of the engine and the level of load on the engine; and a fuel cut-off valve means having a valve member adapted to close a gas fuel passage constituted by the pipe means and the passage in the fuel injector means, upon detection of a reduction of the fuel pressure in the fuel passage.

With this arrangement, the rate of the gas fuel introduced into the cylinder in the event of a stick of the gas fuel injector is limited to the level corresponding to the level of the load. Thus, the rate of the gas fuel flowing from the gas fuel injector is controlled in relation to the intake air flow rate, so that the concentration of the fuel in the exhaust pipe is maintained below the explosion limit, thereby eliminating any risk of explosion.

The above and other objects, features and advantages of the invention will become clear from the following description of the preferred embodiment when the same is read in conjunction with the accompanying drawings.

DESCRIPTION OF THE PREFERRED EMBODIMENTS

Figures 1, 2, 3:
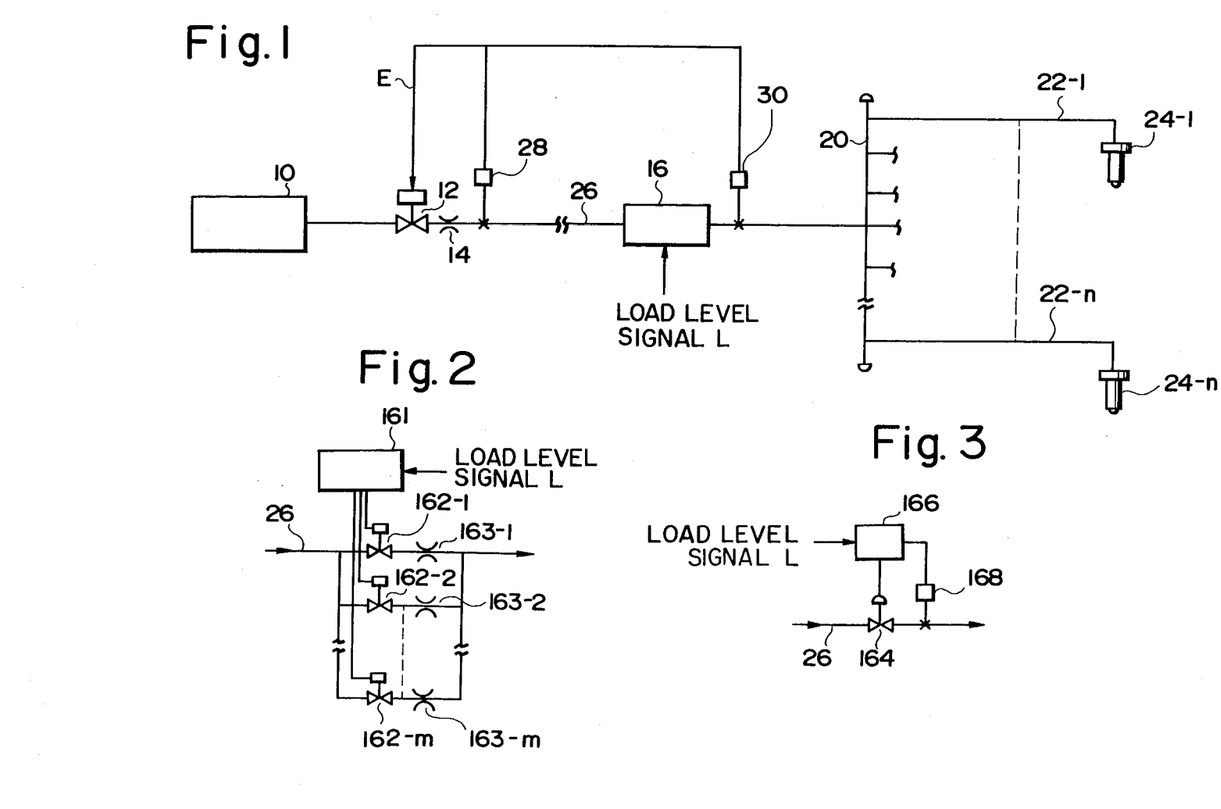
FIG. 1 is an illustration of a first embodiment of the device in accordance with the present invention.
FIG. 2 is a view showing the detail of a maximum flow rate limiting device shown in FIG. 1.
FIG. 3 is a view showing the detail of another example of the maximum flow rate limiting device.

FIG. 1 shows a first embodiment of the device in accordance with the present invention. A gas fuel supply system has a gas fuel supply device 10 which is adapted to supply a gas fuel at a high pressure. The gas fuel from the gas fuel supply device 10 is introduced to a gas fuel common pipe 20 through an emergency cut-off valve 12 which may be a solenoid-actuated valve, an orifice 14, a main gas fuel supply pipe 26, and a maximum flow-rate limiting device 16. The gas fuel common pipe 20 is branched into branch pipes $22_{-i}$ (i=1 to n) which lead to gas fuel injectors $24_{-i}$ (i=1 to n) of respective cylinders. The maximum flow rate limiting device 16 receives an engine load level signal L representing the level of the load applied to the engine. The arrangement is such that the maximum flow rate limiting device 16 limits the flow rate of the gas fuel in the main gas fuel supply pipe 26 in accordance with the engine load signal.

Abnormal flow rate detectors 28 and 30, constituted by pressure detectors, are disposed at the downstream side of the orifice 14 and at the downstream side of the maxmum flow rate limiting device 16, respectively. These abnormal flow rate detectors 28 and 30 are adapted to produce, when the gas fuel pressure in the gas fuel main pipe 26 has come down to abnormally low levels, abnormal flow rate signals E so as to operate the emergency fuel cut-off valve, thereby shutting off the main gas fuel supply pipe 26.

FIG. 2 shows the detail of the maximum flow rate limiting device 16. It will be seen that the device 16 has m parallel branch passages having respective solenoid valves $162_{-j}$ (j=1 to m) and orifices $163_{-j}$. The arrangement is such that the solenoid valves $162_{-j}$ are actuated by the operation of a solenoid valve actuating circuit 161 in accordance with the engine load level signal L, so as to selectively open and close their passages, thereby limiting the flow rate of the gas fuel to a level corresponding to the engine load level.

Each orifice $163_{-j}$ is designed to have the maximum flow rate $Q_{max/m}$ which is obtained through dividing, by the number m of the parallel passages, the the maximum flow rate $Q_{max}$ corresponding to the maximum load level per cylinder. It will be seen that the maximum flow rate of the gas fuel is controlled in m stages in accordance with the load level.

The maximum flow rate limiting device 16 shown in FIG. 2 is only illustrative, and may be modified as shown in FIG. 3. More specifically, the maximum flow rate limiting device 16 shown in FIG. 3 has a flow rate control valve 164 disposed in the main gas fuel supply pipe 26. The degree of opening of this control valve is controlled in accordance with the engine load level signal L. The flow rate is fed back through a flow rate detector 168, so as to enable the control of the flow rate precisely in accordance with the engine load.

The operation of the first embodiment will be described hereinunder.

The description will be made first as to the case where the maximum flow rate limiting device has a construction as shown in FIG. 2. When the gas fuel injectors $24_{-i}$ are operating normally, the timing and duration of each fuel injector are controlled in synchronism with the combustion cycle and in accordance with the load level L, so that the gas fuel is injected successively into cylinders from the gas fuel supply device 10 through the gas fuel common pipe 20 and the banch pipes $22_{-i}$. The flow rate of the gas flowing in the main gas fuel supply pipe 26 corresponds to the level of the load per cylinder of the engine.

In the event that one $24_{-i}$ of the gas fuel injectors fails to close due to stick of the spindle or the valve, the gas fuel is introduced into the corresponding cylinder continuously at a large rate. The flow rate, however, is limited by the maximum flow rate limiting device 16. Namely, the solenoid valves $162_{-j}$ to be closed are beforehand determined in relation to the level of the load level signal L. Therefore, the solenoid valve actuating circuit 161 operates to close the solenoid valves $162_{-j}$, in accordance with the engine load level signal L. Assuming here that the solenoid valves $162_{-l}$ to $162_{-k}$ are closed, the total opening area provided by the orifices $163_{-j}$ is reduced to (m−k)/m, thus limiting the flow rate of the gas fuel in the maximum flow rate limiting device 16 to the level corresponding to the level of the load on the engine. This limited maximum gas fuel flow rate $Q_{max}$ is beforehand determined in relation to the intake air flow rate corresponding to the load level, such that the gas-air ratio does not exceed the explosion limit. Therefore, even when one $24_{-i}$ of the gas fuel injector fails to close due to stick, the fuel concentration in the exhaust pipe is always maintained below the explosion limit, thereby eliminating any risk of explosion in the exhaust pipe.

It will be seen that the maximum gas flow rate $Q_{max}$ also is limited when the maximum flow rate limiting device has the construction shown in FIG. 3.

In the event that an uncontrolled flow of gas fuel has taken place in the portion of the main gas fuel supply pipe 26 upstream of the maximum flow rate limiting device 16, the maximum flow rate is limited by the orifice 14.

During normal operation of the gas fuel injector $24_{-i}$, the opening time of the injector $24_{-i}$ is very short, e.g., 20° to 30° in terms of the crank angle, so that there is no substantial pressure reduction and the pressure determined by the gas fuel supply device 10 is substantially maintained in the main gas fuel supply pipe 26 downstream from the orifice 14 or the maximum flow rate limiting device 16. However, if the gas fuel injector $24_{-i}$ is kept opened due to stick, the pressure of the gas fuel in the portion of the main gas fuel supply pipe 26 downstream of the maximum flow rate limiting device 16 is lowerd to an abnormally low level, because the gas fuel flows continuously at the maximum rate determined by the device 16. This abnormal pressure reduction is detected by the flow rate abnormality detector 30 which produces and delivers the abnormal flow rate signal E to the emergency cut-off valve, thereby cutting off the supply of the fuel. Similarly, in the event of abnormal flow occurring in the main gas fuel supply pipe 26, the flow rate abnormality detector 28 operates to close the emergency cut-off valve 12, thereby stopping the supply of the gas fuel.

As has been described, in the first embodiment of the invention, the maximum flow rate $Q_{max}$ of the gas fuel supplied to each gas fuel injector is limited in accordance with the level of the load applied to the engine, so that undesirable explosion in the exhaust pipe which would result in a damage of the engine is avoided even in the case of stick of one of the gas fuel injectors.

The first embodiment described hereinbefore may be modified such that the cut-off of the fuel is effected by closing all the solenoid valves $162_{-j}$ of the maximum flow rate limiting device 16 shown in FIG. 2 or closing the flow rate control alve 164 in the device 16 shown in FIG. 3 in accordance with the abnormal flow rate signal E produced by the flow rate abnormality detector 30. Such a modification offers an advantage that the wasteful use of the gas fuel is reduced because only a small quantity of gas fuel is confined in the fuel line between the gas fuel common pipe 20 and the maximum flow rate limiting device 16 which is disposed in the close proximity of the latter.

Figure 4:
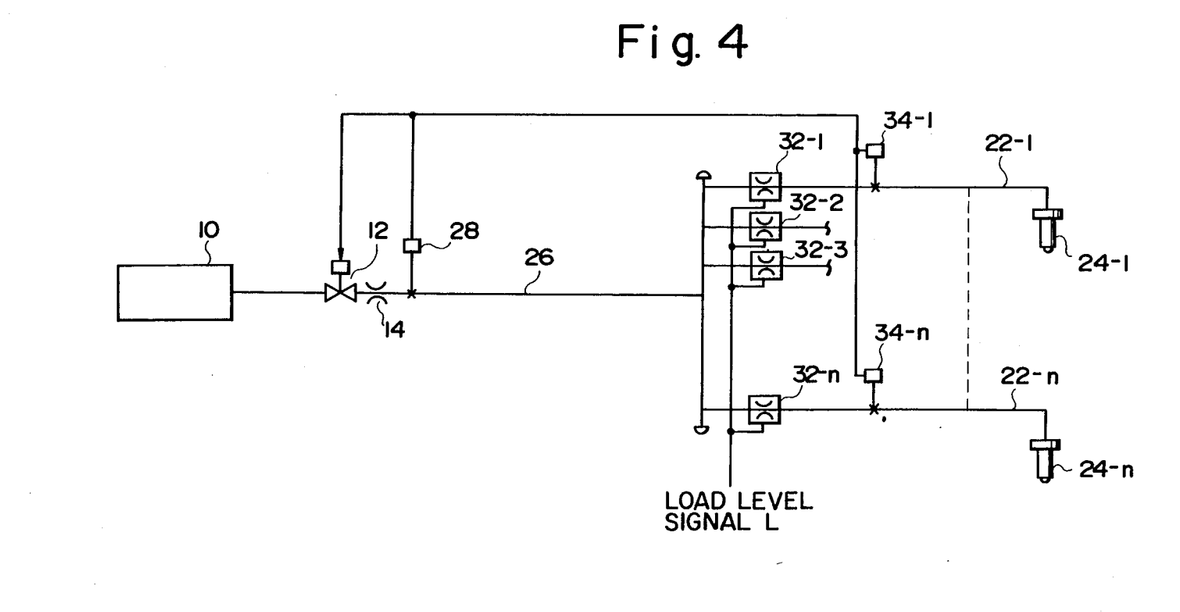
FIG. 4 is an illustration of a second embodiment of the device in accordance with the invention.

FIG. 4 shows a second embodiment of the present invention. This second embodiment is distinguished from the first embodiment in that the maximum flow rate limiting device 16 of the first embodiment shown in FIG. 1 is substituted by a maximum flow rate limiting device which is constituted by a plurality of variable orifices $32_{-i}$ disposed in respective branch pipes $22_{-i}$, the opening areas of respective orifices being controllable in accordance with the load level signal L. Flow rate abnormality detectors $34_{-i}$ are disposed downstream of respective variable orifices $32_{-i}$ and the emergency cut-off valve 12 is operated by abnormal flow rate signal issued from one of the detectors $34_{-i}$. Other portions are materially identical to those of the first embodiment and are denoted by the same reference numerals as those of the first embodiment, with detailed description thereof being omitted.

In this second embodiment, it is possible to locate the variable orifices $32_{-i}$ and the flow rate abnormality detectors as closely as possible to the gas fuel injectors $24_{-i}$. This second embodiment, therefore, offers an advantage that the response of operation to occurrence of stick is improved, besides the advantages brought about by the first embodiment.

The second embodiment can be modified such that each of the variable orifices $32_{-i}$ can be fully closed. In such a modification, when the abnormal flow rate signal E is received by the variable orifice $34_{-i}$, the varibale orifice $32_{-i}$ is fully closed to cut-off the fuel without fail, thereby further ensuring the prevention of occurrence of the explosion.

As will be understood from the foregoing description, according to this embodiment, the maximum flow rate of the gas fuel supplied to the gas fuel injector is limited in accordance with the level of the load applied to the engine, so that the fuel concentration in the exhaust pipe is always maintained below the explosion limit, thereby eliminating the risk of explosion and a consequent damage of the engine which may otherwise be caused as a result of, for example, stick of the gas fuel injector.

Figure 5:
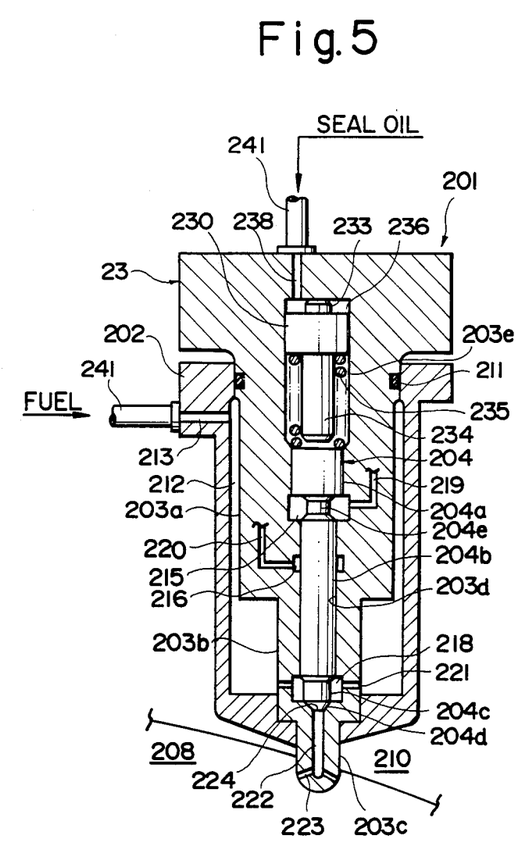
FIG. 5 is a vertical sectional view of a gas fuel injector in accordance with a third embodiment.
Figure 6:
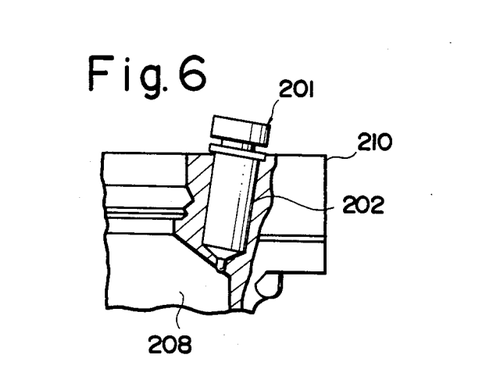
FIG. 6 is an illustration of a gas fuel injector in accordance with the first embodiment, mounted on a cylinder cover of a diesel engine.

A third embodiment of the invention will be described hereinunder with reference to FIG. 5 which shows, in vertical section, a fuel injector provided with the device in accordance with the invention. The fuel injector 201 has an outer cylinder 202, an inner cylinder 203 and a spindle 204. The outer cylinder 20 has a generally cylindrical form and is fixedly mounted on a cylinder cover 210 which in turn is mounted on the engine cylinder 208 defining a combustion chamber. The inner cylinder 203 is fixed to the inner surface of the outer cylinder 202 through a sealing member 211, and has a large-diameter portion 203a of a diameter slightly smaller than the inside diameter of the outer cylinder 202, a small-diameter portion 203b formed on the lower end of the large-diameter portion 203a, and a tip portion 203c formed on the lower end of the small-diameter portion 203b and having a smaller diameter than the latter. A fuel passage 212 is formed between the outer peripheral surface of the inner cylinder 203 and the inner peripheral surface of the outer cylinder 202. A fuel inlet port 213 formed in the wall of the outer cylinder 202 communicates with the fuel passage 212.

The inner cylinder 203 has a central bore along the axis thereof. The central bore 203d receives the spindle 204 axially movably. The spindle has a large-diameter portion 204a, a small-diameter portion 204b formed on the lower side of the large-diameter portion 204a, and an end portion formed on the small-diameter portion 204b and having a smaller diameter than the latter. The extreme end of the end portion 204c is tapred as at 204d. The large-diameter portion 204a and the small-diameter portion 204b are connected through a neck portion 204e having a diameter smaller than that of the small-diameter portion 204b.

The central bore 203d in the inner cylinder 203 is stepped to have portions of a large diameter and a small diameter which slidably receive the large-diameter and small-diameter portions 204a and 204b of the spindle 204. In the valve-open state as shown in FIG. 5, formed are a circumferential groove 215 including the lower surface of the large-diameter portion 204a and the outer peripheral surface of the neck portion 204e, a circumferential groove 216 on the outer peripheral surface of an intermediate portion of the small-diameter portion 204b, and a circumferential groove 218 including the lower surface of the small-diameter portion 204b and the outer peripheral surface of the end portion of the latter.

The circumferential groove 215 is held in communication with a control oil passage 219 which is formed in the inner cylinder 203, so as to be supplied with a control oil from the outside. The circumferential groove 216 is communicated with the seal oil passage 220 which is formed in the inner cylinder 203, so as to be supplied with a seal oil from the outside. A plurality of radial passage holes 221 formed in the small-diameter portion 203b of the inner cylinder 203 opens in the outer peripheral surface of the small-diameter portion 203b and, hence, communicate with the circumferential groove 218.

The lower end portion of the central bore 203d of the inner cylinder 203 constitutes a fuel injection passage 222 which opens into the engine cylinder 208 through a plurality of nozzle ports formed in the wall of the tip portion of the inner cylinder 203 and arranged radially. The portion of the inner cylinder 203 between the fuel injection passage 222 and the central bore 203d is tapered in conformity with the tapered end 204d of the spindle 204, thus constituting a fuel valve seat 224.

Figure 7:
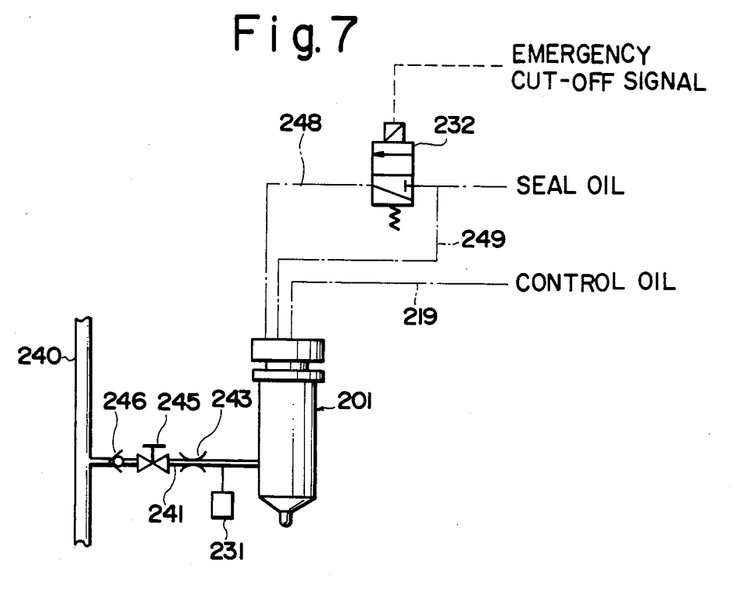
FIG. 7 is a system diagram of the device in accordance with the tjird embodiment of the invention.

Referring now to FIG. 7, the device in accordance with the third embodiment has a piston 230 for emergency fuel cut-off operation, a pressure detector 231 and a seal-oil change-over valve 232.

The piston 230 is received vertically slidably in a hollow chamber 203e constituting the upper end portion of the central bore 203d of the inner cylinder 203. An abutment 233 and a lift stopper 234 are formed integrally with the piston 230 so as to project from the upper and lower surfaces thereof, respectively. An intermediate chamber 203e between the piston 230 and the large-diameter portion 204a of the spindle 204 receives a compression spring 235 which is wound around the lift stopper 234. The compression spring 235 urges the spindle 204 downwardly so as to keep the tapered end 204d of the latter in contact with the fuel valve seat 224. In this state, a predetermined gap is left between the upper surface of the large-diameter portion 204a of the spindle 204 and the lower surface of the lift stopper 234. A seal oil inlet port 238 formed in the top wall of the inner cylinder 203 opens into a cavity 236 which is preserved by the abutment 233 of the piston 230 within the hollow chamber 230.

The pressure detector 231 is dispoded in a fuel supply passage 241 which brnaches from the fuel supply pipe 240 and leads to the fuel inlet port 213. The fuel supply passage 241 also has a check valve 246, a manual stop valve 245 and a fixed orifice 243 which are disposed between the fuel supply pipe 240 and the pressure detector 231 as illustrated. A fuel is supplied from a compressor (not shown) to the fuel inlet port 213 through the fuel supply pipe 240, check valve 246, a manual stop valve 245 and a fixed orifice 243.

The seal oil change-over valve 232 is disposed in a seal oil supply passage 248 which communicates with the seal oil inlet port 238. A seal oil branch passage 249 branching from the portion of the seal oil supply passage 248 upstream of the seal oil change-over valve 232 communicates with the seal oil passage 220. The seal oil change-over valve 232 is adapted to open and close in accordance with a detection signal from a pressure detector 231.

The operation of this third embodiment will be explained hereinunder. When the fuel injector 201 is in the opened state as shown in FIG. 5, the spindle 204 is urged downwardly by the compression spring 235 so as to keep the tapered end 204d thereof in contact with the fuel valve seat 224.

The circumferential groove 218 is continuously supplied with a fuel of a high pressure, e.g., 200 to 250 kg/cm$^2$, through the fuel supply pipe 240, check valve 246, manual valve 245, fixed orifice 243, fuel supply passage 241, and the fuel inlet port 213. On the other hand, a seal oil of a pressure slightly higher than the fuel pressure, e.g., 280 kg/cm$^2$, is supplied to the circumferential groove 216, while the circumferential groove 215 is supplied with a control oil of a low pressure.

In order to open the fuel injector 201, the control oil pressurized by a spindle control oil pump (not shown) is supplid to the circumferential groove 215 through the control oil passage 220. In consequence, the spindle 204 is raised against the force of the compression spring 235 until it is stopped by the lift stopper 234, by the force which is generated by the control oil back pressure acting on the large-diameter portion 204a of the spindle 204. As a result, the tapered end 204d of the spindle 204 leaves the fuel valve seat 224, so that the fuel is introduced at a predetermined flow rate into the cylinder 208 through the fuel injection passage 222 and the fuel injection nozzle ports 223. After the completion of the injection, the supply of the pressurized control oil is stopped and the spindle 204 is lowered by the resetting force of the compression spring 235, whereby the fuel injector is closed as shown in FIG. 5.

In this fuel injector, there is a fear that the fuel injector 201 cannot close the fuel passage even after the completion of the fuel injection due to stick caused by, for example, a seizure of the spindle 204. In such a case, since the fuel passage is kept opened at the fuel valve seat 224, the fuel in the fuel passage 212 is continuously injected through the fuel injection nozzle ports 223.

Consequently, the fuel pressure is decreased in the portion of the fuel passage downstream from the fixed orifice 243. This pressure is detected by the pressure detector 231 which delivers, when this fuel pressure has come down below a predetermined level, an emergency cut-off signal to the seal oil change-over valve 232. As a result, the seal oil change-over valve 232 is opened so that the seal oil is introduced into the cavity 236 through the seal oil supply passage 248 and the seal oil inlet port 238. As a result, the piston 230 is lowered by the force produced by the pressure of the seal oil, so that the piston 230 is lowered against the force of the spring 235, whereby the spindle 204 is lowered by the lift stopper 234 of the piston 230. In consequence, the tapered end 204d of the plunger 204 is seated on the fuel valve seat 224, thus stopping the supply of the fuel.

Figure 8:
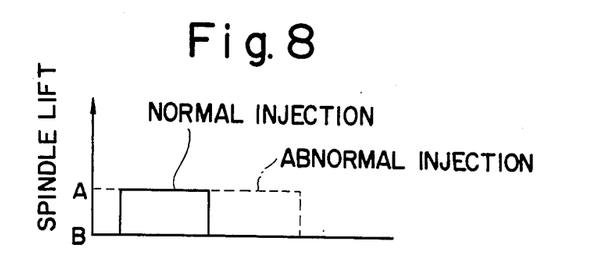
FIG. 8 is a diagram showing the relationship between the lift of a spindle of a gas fuel injector and the fuel injection rate.
Figure 9:
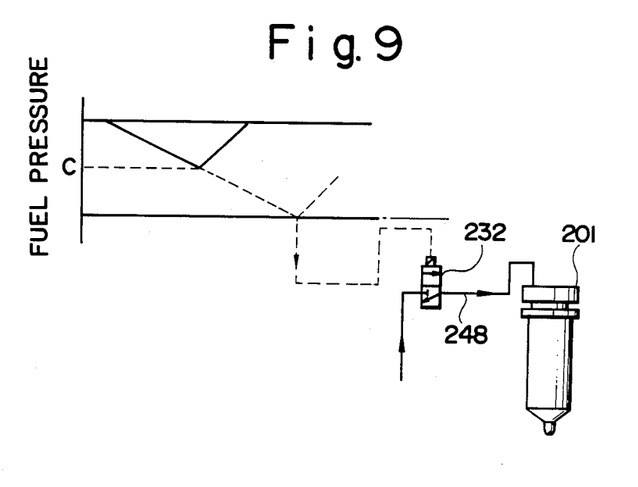
FIG. 9 is a diagram showing the relationship between the change in the fuel pressure and a seal oil changeover valve.

The operation described above will be clearly seen from timing charts shown in FIGS. 8 and 9. Referring first to FIG. 8 which shows the relationship between the lift of the spindle 204 and the injection time, during normal fuel injection, the fuel injection is conducted for a predetermined period while the spindle 204 is in its upper stroke end A and, after the completion of the fuel injection, the plunger 204 is moved without delay downwardly to the lower stroke end B thereof, as indicated by full lines. In contrast, when the injection is conducted abnormally, the timing of the arrival of the spindle 204 at the lower stroke end is delayed as shown by broken lines. Referring now to FIG. 9 which shows the relationship between the change in the fuel pressure and the state of the seal oil change-over valve, during normal fuel injecting operation, the fuel pressure is gradually decreased while the spindle 204 is moved from the upper stroke end A to the lower stroke end B thereof and then gradually rises after the plunger has reached the lower stroke end B. In case of an abnormal fuel injection, however, the fuel pressure comes down below a predetermined pressure C. As a result, the pressure detector 231 delivers an emergency cut-off signal to the seal oil change-over valve 232, thereby cuttin off the fuel supply in a manner explained above.

Although the described embodiment is applied to the fuel injector 201 which is intended for use with a single type of fuel, it will be clear to those skilled in the art that this embodiment can be applied equally well also to fuel injectors which handle two types of fuel simultaneously, i.e., a main fuel and a sub-fuel.

As will be seen from the foregoing description, in the third embodiment of the invention, the seal oil valve is opened in respnse to a fuel passage emergency cut-off signal produced when the fuel pressure in the fuel supply passage has come down below a predetermined level. As a result, the spindle is lowered to shut-off the fuel injection passage, so as to prevent the uncontrolled flow of the fuel into the engine cylinder, thus achieivng a high degree of safety in the fuel injection. Furthermore, since the change in the fuel pressure is detected in the fuel supply passage which experiences the greatest change, it is possible to cut-off the fuel injection passage promptly and without fail upon detection of abnormal fuel injection.

A fourth embodiment of the invention will be described hereinunder with reference to FIG. 10 which shows, in vertical section, a fuel injector provided with the fourth embodiment of the device in accordance with the invention. The fuel injector 301 has an outer cylinder 302, an inner cylinder 303, a spindle 304, a lift limiting plug 305, and a compression spring 306 as an urging means. The outer cylinder 302 has a generally cylindrical form and is fixedly mounted on a cylinder cover 310 which in turn is mounted on the engine cylinder 308 defining a combustion chamber. The inner cylinder 303 is fixed to the inner surface of the outer cylinder 302 through a sealing member 311, and has a large-diameter portion 303a of a diameter slightly smaller than the inside diameter of the outer cylinder 302, a small-diameter portion 303b formed on the lower end of the large-diameter portion 303a, and a tip portion 303c formed on the lower end of the small-diameter portion 303b and having a smaller diameter than the latter. A fuel passage 312 is formed between the outer peripheral surface of the inner cylinder 303 and the inner peripheral surface of the outer cylinder 302. A fuel inlet port 313 formed in the wall of the outer cylinder 302 communicates with the fuel passage 312.

The inner cylinder 303 has a central bore along the axis thereof. The central bore 303d receives the spindle 304 axially movably. The spindle has a large-diameter portion 304a, a small-diameter portion 304b formed on the lower side of the large-diameter portion 304a, and an end portion 304c formed on the small-diameter portion 304b and having a smaller diameter than the latter. The extreme end of the end portion 304c is tapred as at 304d. The large-diameter portion 304a and the small-diameter portion 304b are connected through a neck portion 304e having a diameter smaller than that of the small-diameter portion 304b.

The central bore 303d in the inner cylinder 303 is stepped to have portions of a large diameter and a small diameter which slidably receive the large-diameter and small-diameter portions 304a and 304b of the spindle 304. In the valve-open state as shown in FIG. 10, formed are a circumferential groove 315 including the lower surface of the large-diameter portion 304a and the outer peripheral surface of the neck portion 304e, a circumferential groove 316 on the outer peripheral surface of an intermediate portion of the small-diameter portion 304b, and a circumferential groove 318 including the lower surface of the small-diameter portion 304b and the outer peripheral surface of the end portion of the latter.

The circumferential groove 315 is held in communication with a control oil passage 319 which is formed in the inner cylinder 303, so as to be supplied with a control oil from the outside. The circumferential groove 316 is communicated with the seal oil passage 230 which is formed in the inner cylinder 303, so as to be supplied with a seal oil from the outside. A plurality of radial passage holes 231 formed in the small-diameter portion 303b of the inner cylinder 303 opens in the outer peripheral surface of the small-diameter portion 303b and, hence, communicate with the circumferential groove 318.

The lower end portion of the central bore 303d of the inner cylinder 303 constitutes a fuel injection passage 322 which opens into the engine cylinder 308 through a plurality of nozzle ports formed in the wall of the tip portion of the inner cylinder 303 and arranged radially. The portion of the inner cylinder 303 between the fuel injection passage 322 and the central bore 303d is tapered in conformity with the tapered end 304d of the spindle 304, thus constituting a fuel valve seat 324.

The lift limiting plug 305 is screwed into a threaded recess 303e which is formed in the upper end portion of the central bore 303d of the inner cylinder 303 so as to open upwardly and having an inside diameter slightly greater than that of the central bore 303d. The lift limiting plug 305 has a lift stopper 325 formed integrally therewith and coaxial with the spindle 304, the lift stopper 325 having a diameter smaller than that of the large-diameter portion 304a. When the fuel injector 301 is in the open state as shown in FIG. 10, the lower surface of the lift stopper 325 is spaced apart from the upper surface of the large-diameter portion 304a of the spindle 304 by a predetermined distance. The compression spring 306 is wound around the lift stopper 325 and urges the spindle 304 downwardly.

The device of this embodiment for preventing abnormal flow of fuel is provided with a valve device 330 which is disposed in a fuel supply passage leading to a compressor (not shown) and the fuel inlet port 313. The valve device 330 is composed of a housing 32, a valve member 333 and a compression spring 335.

Figure 11:
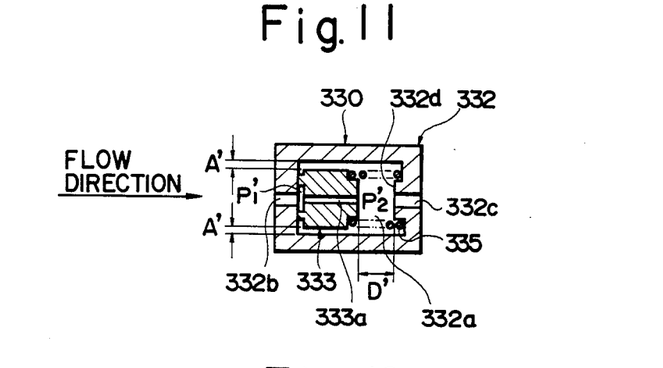
FIG. 11 is an illustration of the detail of the fourth embodiment.

The housing 332 has a hollow chamber 332a. Communication ports 332b and 332c formed in both end walls of the housing 332 communicate with the hollow chamber 332a at their one ends and at their other ends with the compressor and the fuel inlet port 313, respectively. The valve member 333 is received in the hollow chamber 332a, leaving a gap A between the wall of the housing 332 and the surface of the valve member 333. The valve member 333 is provided with a central axial through bore 333a of a very small diameter.

The compression spring 335 is received in the portion of the hollow chamber 332a adjacent the communication port 332c, so that the valve member 333 is urged towards the communication port 332b by the force of the compression spring 335. As will be seen from FIG. 11, the valve member 333 in the opened state contacts with the left end wall of the hollow chambwr 332a. In this state, a clearance D' is formed between the right end surface of the valve member 333 and the end surface of the hollow chamber 332a having the communication port 332c, i.e., the seat surface 332d.

The volume of the space in the hollw chamber 32a corresponding to the clearance D', i.e., the stroke volume, is determined to be greater than the amount of fuel injection. Practically, in order to prevent any abnormal flow of the fuel, this stroke volume is determined to be one to several times as large as the maximum injection amount.

The operation of this embodiment will be explained hereinafter. As will be seen from FIGS. 10 and 11, when the fuel injector 301 is in the closed state, the spindle 304 is urged downwardly by the compression spring 306, so that the tapered portion 304d is seated on the fuel valve seat 324 so as to close the fuel passage. In this state, the fuel pressures $P_1'$ and $P_2'$ acting on both end surfaces of the valve member 333 of the valve device 330 are equal to each other, so that the valve member 333 is kept in the leftmost open position by the force of the compression spring. Therefore, the circuxferential groove 318 is continuously supplied with the fuel of the high pressure, e.g., 200 to 250 kg/cm$^2$ through the communication port 332b, gap A' in the hollw chamber 332a, through bore 333a, communication port 332c, fuel supply passage 331 and the fuel inlet port 313. On the other hand, the circumferential groove 316 is supplied with a seal oil of a pressure which is slightly greater than the fuel pressure, e.g., 280 kg/cm$^2$, from the seal oil passage 320, while the circumferential groove 315 is filled with a control oil from the control oil passage 319 which is normally maintained at a low pressure.

For the purpose of opening the fuel injection valve 301, the control oil pressurized by a spindle control pump (not shown) is supplied to the circumferential groove 315 through the control oil passage 319. As a result, the plunger 304 is lifted against the force of the compression spring 306 until it is stopped by the lift stopper 325, by the force produced by the control oil back pressure acting on the large-diameter portion 304a of the spindle 304. As a result, the valve member leaves the fuel valve seat 324 so that the fuel is injected at a predetermined rate into the engine cylinder 308 through the fuel injection passage 322 and the fuel injection nozzle ports 323.

As the fuel injection is commenced, the fuel pressure in the hollow chamber 332a starts to fall so as to establish a condition expressed by $P_1'>P_2'$. As the pressure differential grows to exceed the force of the spring 335, the valve member 333 is moved to the right. However, since the stroke volume of the valve device 330 is selected to be greater than the fuel injection rate, the fuel injection is completed before te valve member 333 contacts the seat surface 332d, i.e., before the valve is closed.

Figure 10:
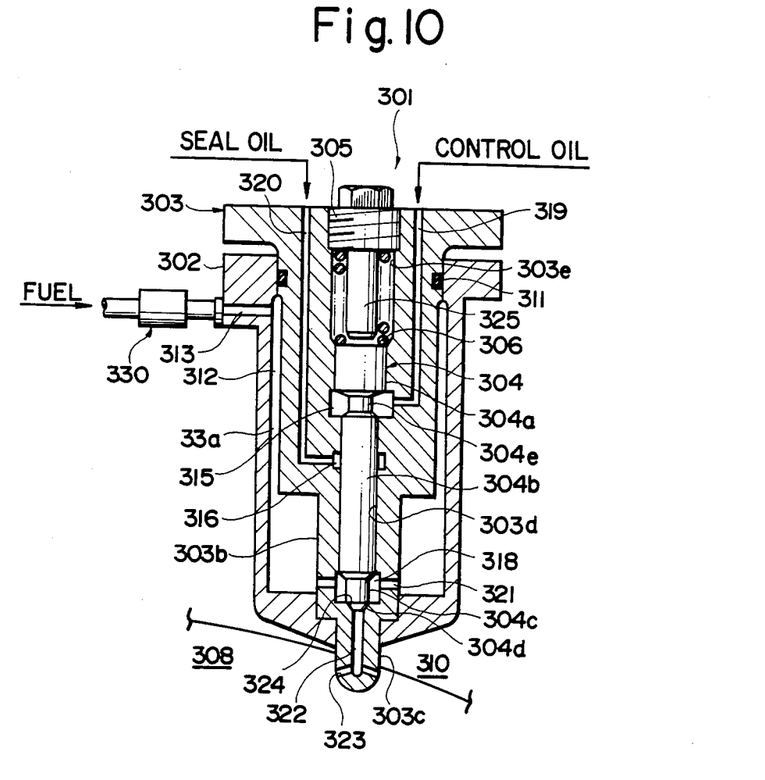
FIG. 10 is an illustration of a device of a fourth embodiment of the invention assembled together with a gas fuel injector.

When the fuel injection period is over, the supply of the pressurized control oil is ceased, so that the spindle 304 is lowered by the resetting force of the compression spring 306, thus closing the fuel passage as shown in FIG. 10. Simultaneously, the pressure $P_2'$ is resumed in the hollow chamber 332a as a result of the supply of the fuel through the gap A' and the through bore 333a. Conseqently, the valve member 333 is moved away from the seat surface 332d by the force of the compression spring 333 into contact with the left end surface of the hollow chamber 332a. As a result, the condition of $P_1'=P_2'$ is resumed and the fuel injector 301 is reset to the open state again.

The gapA' and the area of the passage provided by the through bore 333a are so determined that the hollow chamber is filled up with the fuel by the pressure differential $(P_1'-P_2')$ in the period between the moment at which the fuel injection is commenced till the moment at which the next fuel injection cycle is started.

In the event of a closing failure of the fuel injector 301 due to, for example, a sezure of the spindle 304, the passage on the fuel valve seat 324 is kept opened so that the fuel in the fuel passage 312 is continuously injected through the fuel injection nozzle ports 323.

In consequence, the fuel pressure in the fuel passage 313 is gradually decresed so that the fuel pressure in the hollow chamber 332a also is lowered to establish the condition of $P_1'>P_2$. As the force produced by this pressure differential grows large to exceed the force of the spring, the valve member 333 is moved towards the seat surface 332d and, when the amount of fuel injected into the engine cylinder reaches the amount corresponding to the stroke volume provided by the clearance D', the right end surface of the valve member 333 is brought into contact with the seat surface 332d thereby closing the fuel passage. In this state, the fuel is supplied to the fuel passage 312 through the through bore 33a in the valve member 333 but the rate of supply of the fuel is extremely small so that the injection of fuel into the engine cylinder 308 is stopped almost completely.

As the normal closing state of the fuel injector 301 is resumed, the fuel passage 312 and the hollow chamber 332a are suppied with the fuel through the through bore 333a so that the pressure $P_2'$ is recovered to allow the valve member 333 to be moved away from the seat surface 332d by the resetting force of the compression spring 335. In consequence, the valve member 333 is brought into contact with the left end surface of the hollow chamber 332a, thus attaining the condition of $P_1'=P_2'$, thereby resetting the valve device 330 to the open state.

When the valve member 333 is switched from the closed state to the opened state, the separation of the valve member 333 from the seat surface 333d is conducted without difficulty because of the fuel supply through the through bore 333a, although this fuel supply is conducted at a very small rate. The separation of the valve member 333 from the seat surface 333, however, may be effected by other means than the through bore 333a formed in the valve member 333.

Although in the described embodiment the fuel injector 301 operates with a sngle type of fuel, it will be clear to those skilld in the art that the embodiment can equally be applied to a fuel injector which operates both with a main and a sub-fuel. The valve device 330, which is described to be installed outside the fuel injector 301, may be incorporated in the fuel injector 301.

As will be understood from the foregoing description, in this embodiment of the device in accordance with the invention, the fuel supply passage is closed without delay when the fuel is injected from the fuel injector at a rate exceeding a predetermined rate. In consequence, extraordinary fuel injection into the engine cylinder is avoided to ensure the safety. In addition, since the device for preventing the abnormal flow of the fuel can be mounted outside the fuel injector, the maintenance and inspection, as well as replacement in the event of a trouble, are facilitated advantageously.

Figure 12:
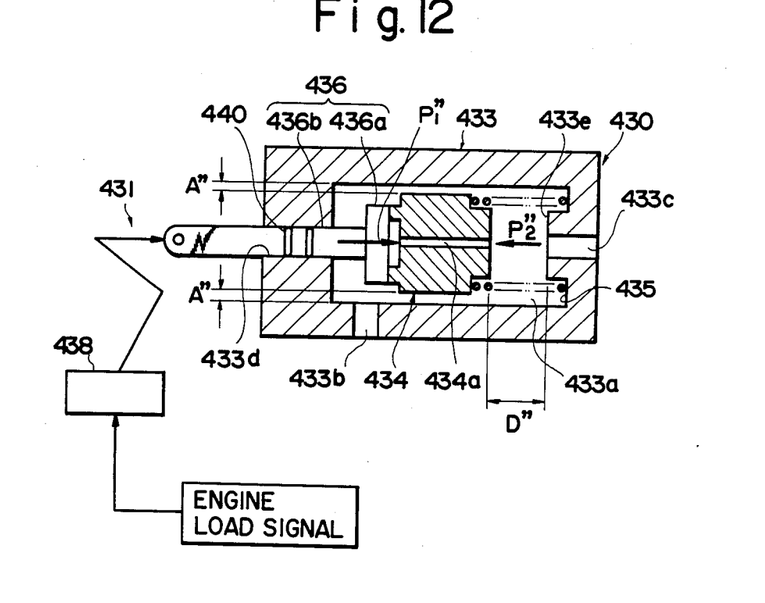
FIG. 12 is an illustration of a modification of the fourth embodiment of the invention.

Referring now to FIG. 12 showing a fifth embodiment, a hollow chamber 433a is formed in the housing 433. A communication port 333b formed in a left portion of the lower wall of the housing 433 communicates at its one end with the hollw chamber 433a and at its other end with the compressor. Another communication port formed in the right end wall of the housing 433 communicates at its one end with the hollow chamber 433a and at its other end with the fuel inlet port 413. A valve member 434 is received in the hollow chamber 433a such that gaps A are left between the valve member 434 and the walls of the housing 433 at the upper and lower sides of the valve member, 434. A compression spring 435 is received in the portion of the hollow chamber 433a adjacent the communication port 433c and urges the valve member 434 towards the communication port 433b.

The position adjusting mechanism 431 is provided with an adjusting member 436 and a positioner 438. The adjusting member 436 is constituted by a flange portion 436a accommodated by the hollow chamber 433a adjacent to the communication port 433b, and a shaft portion 436b slidably received in a through bore 433d formed in the left end wall of the housing 433 through a sealing member 440. The flange portion 436a is pressed at its right side surface by the valve member 434 which is urged by the compression spring 435. The positioner 438 is adapted to be actuated by a signal which corresponds to the engine load, and is drivingly connected to the shaft portion 436b of the adjusting member 436 mechanically, hydraulically or electrically.

A clearance D" is formed between the right end surface of the valve member 434 and the end surface of the hollow chamber 433a including the communication port 433c, i.e., the seat surface 433e. The volume of this intermediate chamber 433a provided by the clearance D", i.e., the stroke volume (referred to as "set amount" hereinafter), can be adjusted by the displacement of the adjusting member 436.

The operation of this modification is as follows.

When the fuel injector 201 is in the open state as shown in FIG. 10, the spindle 304 is urged downwardly by the compression spring 306, so that the tapered portion 304d is seated on the fuel valve seat 324 so as to block the fuel passage. The adjusting member 436 is displaced together with the valve member 433 to a position corresponding to the level of the load when the engine load signal is inputted to the positioner 438. More specifically, the position of the valve member 434 is shifted leftward as the level of the engine load is increased, so that the set amount is increased. Conversely, the position of the valve member 433 is shifted to the right as the level of the engine load is lowered, so that the set amount is decreased. The set amount is determined to be slightly greater than the amount of fuel injection in the normal operation at each load level.

In this modification, as stated before, the set amount is changed in accordance with the engine load level, so that it is possible to reduce the ratio between the fuel injection rate in the abnormal state and that in the normal state of the fuel injector, at each load level. This means that, when the flow rate of air in the combustion chamber and the exhaust system is decreased in accordance with a reduction in the load level, the set amount is decreased correspondingly, so that the supply of the fuel is prevented almost perfectly in the abnormal state of the fuel injector. This in turn suppresses the rise of concentration of unburnt gas, so that the risk of undesirable explosion in the combustion chamber and the exhaust system is avoided to ensure a safe operation of the engine.

Although the invention has been described through specific terms, it is to be noted that the described embodiments are only illustrative and various changes and modifications may be imparted thereto without departing from the scope of the invention which is limited solely by the appended claims.

What is claimed is:

1. A device for preventing abnormal flow of gas fuel from a gas fuel injector of a diesel engine comprising:
   a pipe means for supplying a pressurized gas fuel;
   a fuel injector means including a housing having a passage connected to said pipe means and leading to fuel injection nozzle ports, and a valve member having a piston portion and adapted to open and close said passage by the force produced by a control oil in accordance with the speed of said engine and the level of load on said engine; and
   a fuel cut-off valve means having a valve member adapted to close a gas fuel passage constituted by said pipe means and said passage in said fuel injector means, in response to a reduction of the fuel pressure in said fuel passage.

2. A device according to claim 1, wherein said valve member of said fuel injector means constitutes said valve member of said fuel cut off valve means and is supported in said housing axially movably, said device further comprising: a circumferential groove formed between said passage in said housing and said piston portion of said valve member which receives the pressure of a control oil and surrounding said valve member, said circumferential groove being supplied with said control oil; a pressure detector provided in said fuel passage and adapted to detect the reduction of the fuel pressure in said fuel passage and to produce a detection signal upon detection of the pressure reduction down to a level below a predetermined pressure; and a change-over valve adapted to apply the pressure of a seal oil to said valve member in response to said detection signal thereby causing said valve member to close said fuel passage overcoming the force of a spring.

3. A device according to claim 1, further comprising: a maximum flow rate limiting means provide in said fuel passage and adapted for limiting the maximum fuel flow rate in accordance with the engine speed and the load level; a pressure detector disposed on the downstream side of said maximum flow rate limiting means and adapted to produce a signal for operating said fuel cut-off valve means so as to close said fuel passage, upon detection of the reduction of the fuel pressure down to a level below the level corresponding to the maximum fuel flow rate.

4. A device according to claim 3, wherein said maximum flow rate limiting means includes a plurality of cut-off valves connected to fuel supplying means and a plurality of orifices connected to respective cut-off valves, said cut-off valves being adapted to be selectively opened in accordance with the engine speed and the load level so that the maximum flow rate of the gas fuel is limited by the orifices connected to the opened cut-off valves.

5. A device according to claim 3, wherein said maximum flow rate limiting means includes a single variable orifice the opening area of which is controllable in accordance with the engine speed and the load level so as to limit the maximum flow rate of the fuel in accordance with the engine speed and the load level.

6. A device according to claim 1, wherein said cut-off valve means constitutes a maximum flow rate limiting means which limits the maximum flow rate of the fuel in accordance with the engine speed and the load level.

7. A device according to claim 6, wherein said maximum flow rate limiting means includes a housing having fuel gas inlet port and outlet port, and a valve member accommodated by said housing and urged by a spring towards said fuel inlet port, said valve member having a small through bore providing a communication between said fuel inlet port and said fuel outlet port, said valve member being adapted to be pressed by the pressure of the gas fuel onto said fuel outlet port so as to limit the supply of said fuel when the pressure differential between said fuel inlet port and said fuel outlet port has come to exceed a predetermined level.

8. A device according to claim 7, wherein the clearance between said valve member and said fuel outlet port of said maximum flow rate limiting means is controlled in accordance with the engine speed and the load level.

* * * * *